United States Patent
Diab

(10) Patent No.: US 8,457,122 B2
(45) Date of Patent: Jun. 4, 2013

(54) MULTIPORT SWITCH FOR CASCADED ETHERNET AV DEVICE NETWORKING

(75) Inventor: Wael William Diab, San Francisco, CA (US)

(73) Assignee: Broadcom Corporation, Irvine, CA (US)

( * ) Notice: Subject to any disclaimer, the term of this patent is extended or adjusted under 35 U.S.C. 154(b) by 70 days.

(21) Appl. No.: 11/832,014

(22) Filed: Aug. 1, 2007

(65) Prior Publication Data

US 2009/0034518 A1  Feb. 5, 2009

(51) Int. Cl.
*H04J 3/04* (2006.01)

(52) U.S. Cl.
USPC ................ 370/389; 370/235; 370/463

(58) Field of Classification Search
USPC .......................... 370/235, 389, 463
See application file for complete search history.

(56) References Cited

U.S. PATENT DOCUMENTS

| | | | |
|---|---|---|---|
| 6,505,255 B1 * | 1/2003 | Akatsu et al. ................. | 709/239 |
| 6,532,232 B1 * | 3/2003 | Goodwin, III ................. | 370/389 |
| 6,653,933 B2 * | 11/2003 | Raschke et al. ............... | 370/203 |
| 6,747,654 B1 * | 6/2004 | Laksono et al. .............. | 345/502 |
| 6,760,336 B1 * | 7/2004 | Mangin et al. ............ | 370/395.21 |
| 6,892,230 B1 * | 5/2005 | Gu et al. ........................ | 709/220 |
| 6,975,613 B1 * | 12/2005 | Johansson ..................... | 370/338 |
| 6,977,939 B2 * | 12/2005 | Joy et al. ...................... | 370/401 |
| 7,139,269 B2 * | 11/2006 | Kalkunte et al. .............. | 370/389 |
| 7,230,939 B2 * | 6/2007 | Toyoshima .................... | 370/338 |
| 7,317,734 B2 * | 1/2008 | Joy et al. ........................ | 370/466 |
| 7,433,302 B2 * | 10/2008 | Allen ............................. | 370/224 |
| 7,440,809 B2 * | 10/2008 | Lehman et al. .................. | 700/83 |
| 7,447,197 B2 * | 11/2008 | Terrell et al. ................... | 370/360 |
| 7,450,617 B2 * | 11/2008 | Cheung et al. ................. | 370/536 |
| 7,463,647 B2 * | 12/2008 | Stone et al. .................... | 370/465 |
| 7,490,293 B1 * | 2/2009 | Humpleman et al. ......... | 715/734 |
| 7,610,559 B1 * | 10/2009 | Humpleman et al. ......... | 715/762 |
| 7,624,417 B2 * | 11/2009 | Dua ............................... | 725/114 |
| 7,698,723 B2 * | 4/2010 | Hicks et al. ..................... | 725/82 |
| 7,715,783 B2 * | 5/2010 | Girard et al. ................. | 455/3.02 |
| 2002/0013784 A1 * | 1/2002 | Swanson ..................... | 707/104.1 |
| 2002/0080775 A1 * | 6/2002 | Engbersen et al. ........... | 370/352 |
| 2002/0085551 A1 * | 7/2002 | Tzeng ........................... | 370/389 |
| 2002/0085585 A1 * | 7/2002 | Tzeng ........................... | 370/475 |
| 2002/0085586 A1 * | 7/2002 | Tzeng ........................... | 370/475 |
| 2002/0093973 A1 * | 7/2002 | Tzeng ........................... | 370/419 |
| 2002/0136225 A1 * | 9/2002 | Joy et al. ........................ | 370/401 |
| 2003/0133476 A1 * | 7/2003 | Stone et al. .................... | 370/537 |
| 2003/0167472 A1 * | 9/2003 | Barbanson et al. ........... | 725/131 |
| 2004/0078787 A1 * | 4/2004 | Borek et al. ................... | 717/136 |
| 2004/0151175 A1 * | 8/2004 | Moll et al. ..................... | 370/389 |
| 2005/0036764 A1 * | 2/2005 | Grossman et al. ............. | 386/94 |

(Continued)

OTHER PUBLICATIONS

Michael J. Teener, "Ethernet AV™ Summary," Apr. 2006.

(Continued)

*Primary Examiner* — Jay P Patel

(74) *Attorney, Agent, or Firm* — Duane S. Kobayashi

(57) ABSTRACT

A multiport switch for cascaded Ethernet audio/visual (AV) device networking. AV devices are configured with multiple external Ethernet ports and an internal port. These multiple Ethernet ports enable the AV devices to operate as a terminating AV device or as an intermediary switch. With this functionality, a cascading chain of AV devices can be used to support traffic between the connected set of AV devices. Independent links between the sets of devices would not be required as with conventional point-to-point topologies.

17 Claims, 6 Drawing Sheets

U.S. PATENT DOCUMENTS

| | | | |
|---|---|---|---|
| 2005/0120301 A1* | 6/2005 | Humpleman et al. | 715/515 |
| 2005/0157732 A1* | 7/2005 | Joy et al. | 370/401 |
| 2006/0072489 A1* | 4/2006 | Toyoshima | 370/328 |
| 2006/0083512 A1* | 4/2006 | Wake | 398/59 |
| 2006/0129938 A1* | 6/2006 | Humpleman et al. | 715/734 |
| 2006/0277576 A1* | 12/2006 | Acharya et al. | 725/46 |
| 2007/0206089 A1* | 9/2007 | Eshkoli et al. | 348/14.02 |
| 2007/0250616 A1* | 10/2007 | Morelli et al. | 709/223 |
| 2008/0066131 A1* | 3/2008 | Chang et al. | 725/113 |
| 2008/0320545 A1* | 12/2008 | Schwartz | 725/135 |
| 2010/0020814 A1* | 1/2010 | Thyni | 370/412 |
| 2010/0054243 A1* | 3/2010 | Stone et al. | 370/389 |

OTHER PUBLICATIONS

Michael J. Teener, "AV Bridging and Ethernet AV™," Mar. 2007.

* cited by examiner

MULTIPORT SWITCH FOR CASCADED ETHERNET AV DEVICE NETWORKING

BACKGROUND

1. Field of the Invention

The present invention relates generally to Ethernet networks and, more particularly, to a multiport switch for cascaded Ethernet audio/visual (AV) device networking.

2. Introduction

The current wired home network relies on a non-user friendly point-to-point connection topology where the user has to be aware of the exact topology of the connection. Moreover, the user must be aware of the specific set of ports and the type of connection through which a device will be connected to another device.

For example, in a typical home AV application, a receiver is often designed as a central hub to which various devices such as a television, CD/DVD player, speakers, digital video recorder (DVR), computing device, etc. are connected. In this point-to-point topology, a user will typically rely on different sets of ports on the receiver for connection to individual devices. These different sets of ports can be of various types such as component video, S-video, coaxial, firewire, USB, HDMI, etc.

One of the limitations of such a point-to-point topology is the increased cabling costs in supporting multiple point-to-point connections. Moreover, the point-to-point topology can often limit the physical placement of the various devices due to the long cabling spans that are required for connection to a centralized hub. In general, point-to-point topologies lead to increased complexity and costs in various AV applications. What is needed therefore is a mechanism that enables users to simplify the process of deploying and configuring such AV networks.

SUMMARY

A multiport switch for cascaded Ethernet audio/visual (AV) device networking, substantially as shown in and/or described in connection with at least one of the figures, as set forth more completely in the claims.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

Ethernet networks have become ubiquitous in their deployment across corporate and residential markets. In supporting high-bandwidth traffic, these Ethernet networks have benefited from the significant reduction in costs afforded by the growing economies of scale. Levels of network traffic are expected to increase, meaning that typical network connections will increasingly support 1000BASE-T, 10 GBASE-T and beyond.

One of the major drivers of this increase in traffic is the rise in AV streaming across the network. Not only does AV streaming place significant bandwidth demands on the network, AV streaming is also sensitive to latency issues. For this reason, AV bridging such as that described in IEEE 802.1 has been developed to reserve a connection with a certain quality of service (QoS). In this process, a synchronization protocol and a bandwidth reservation protocol would be implemented to reserve a connection with guaranteed levels of bandwidth and latency. As would be appreciated, additional functionality such as encryption and compression can also be incorporated.

Latency, in particular, is a significant issue and would require the periodic exchange of timing information that would allow both ends of the link to synchronize their time-of-day clock precisely. In one embodiment, different granularities can be used to meet different traffic classes. For example, 125 s periods (used in most current isochronous transports) can be used for low latency streams, while 1 ms periods can be used for moderate latency streams.

During link establishment, AV devices would exchange capability information. If the devices have the same network synchronization capability, the devices would then exchange clock synchronization and configuration information. Bridges between the devices would similarly be involved in the exchange of synchronization and configuration information. If all links in the connection between the devices can support network synchronization, then the connection having a certain QoS can be reserved. In contrast, if one of the links in the connection between the devices cannot support network synchronization, then the connection having a certain QoS cannot be reserved.

Figure 1:
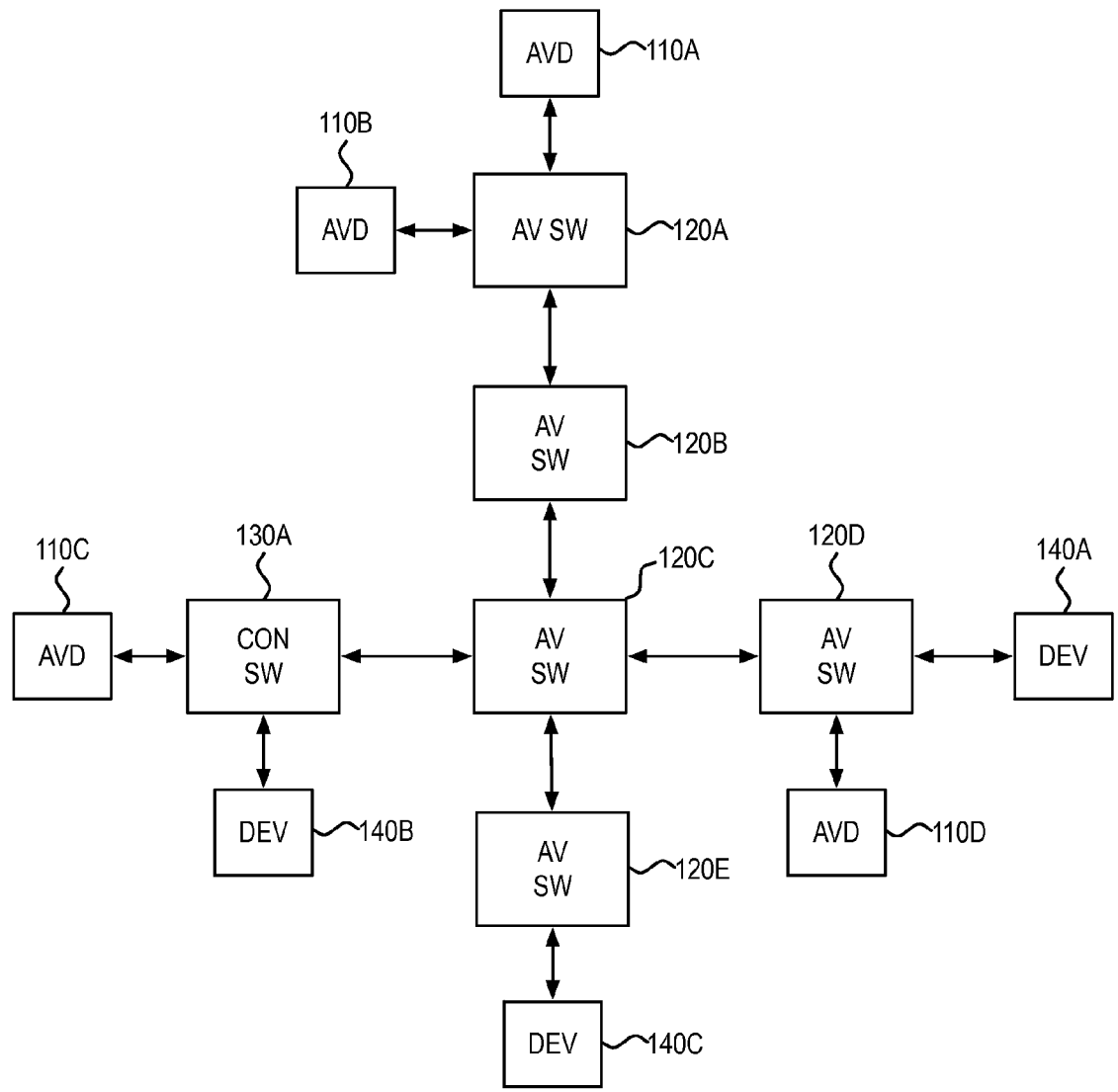
FIG. 1 illustrates an example of an Ethernet network that enables connectivity of audio/visual (AV) devices.

FIG. 1 illustrates an example of a network that supports connections between multiple devices. Two types of devices are shown in this example, AV devices (AVDs) 110A-110D and conventional Ethernet devices (DEVs) 140A-140C. Here, AVDs 110A-110D represent Ethernet devices that would support network synchronization, while DEVs 140A-140C represent Ethernet devices that would not support network synchronization. As illustrated, AVDs 110A-110D and DEVs 140A-140C are connected via various network switches. Two types of switches are shown in this example, AV switches (AV SWs) 120A-120D and conventional switch (CON SW) 130A. Here, AV SWs 120A-120E are switches that would support network synchronization, while CON SW 130A is a switch that would not support network synchronization.

As noted, a connection having a certain QoS can be reserved only if the devices and switches in the link all have network synchronization capability. If any of the devices or switches do not support the exchange of clock synchronization and configuration information, then only a non-guaranteed connection can be established.

With this framework, AVD 110A could establish a guaranteed QoS connection with AVD 110D, since AVDs 110A and 110D are supporting peer devices, and switches 120A-120D are supporting switches. AVD 110A could not establish a guaranteed QoS connection with DEV 140A, however, because DEV 140A is a non-supporting peer device. Also, AVD 110A could not establish a guaranteed QoS connection with AVD 110C because CON SW 130A is a non-supporting switch. For these latter two examples, only a non-guaranteed connection can be established.

As illustrated in the example of FIG. 1, networking environments (e.g., home networking) often implement star topologies as a switch provides the central hub function in connecting various devices (e.g., computing devices, printers, wireless access points, or the like). This star topology is also common in conventional home entertainment applications as an AV receiver typically provides a central hub for a television, speakers, CD/DVD players, DVR, game console, computing device, or the like. Complicating this home entertainment application is that each of the point-to-point connections between pairs of AV devices are based on different sets of ports and different types of connections such as component video, S-video, coaxial, firewire, USB, HDMI, DVI, DisplayPort, etc.

One of the new AV applications that is gaining in prominence is the transport of high definition television (HDTV) signals. Owing to the increased resolution, HDTV signal transport requires significantly more bandwidth as compared to the transport of standard definition television signals. For example, an uncompressed 1080i HDTV video signal alone can take up to 1.4 Gbit/sec of bandwidth. Full HDTV content at 1080p would require even higher levels of bandwidth.

Today, typical HDTV transport is provided via HDMI connections (e.g., between HD DVD player and television). In the present invention, it is recognized that Ethernet can represent an alternative transport mechanism for HDTV content. For example, uncompressed HDTV content can be transported using 10 GBASE-T, while compressed HDTV content can be transported using 1000BASE-T. In general, the Ethernet speed would be based on the type of content that is being transported. At short ranges, 10 GBASE-T can require fractionally more power and cost as compared to 1000BASE-T. 10 GBASE-T can therefore be cost competitive with HDMI when considering component and manufacturing costs. Notwithstanding the issue of cost parity, 10 GBASE-T Ethernet has significant additional advantages.

Figure 2:
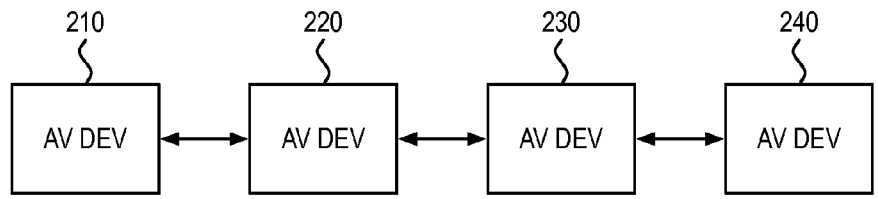
FIG. 2 illustrates an example of a cascading Ethernet network between AV devices.

One of these advantages is the creation of a new network topology within the context of conventional AV networks such as home entertainment applications or the like. Here, it is a feature of the present invention that a cascading network topology can be used in place of a conventional star topology. This cascading topology is illustrated in FIG. 2. As will be described in greater detail below, an advantage of such a cascading network topology is the elimination of the plethora of connectors that are often present on the back of a device. This collection of connectors can be replaced with simple and identical Ethernet connectors.

As illustrated in FIG. 2, a series of cascading AV devices (AV DEVs) 210-240 are shown. Each of these AV DEVs 210-240 can individually represent devices such as a receiver, television, DVD player, DVR, game console, computing device, or the like.

Figure 3:
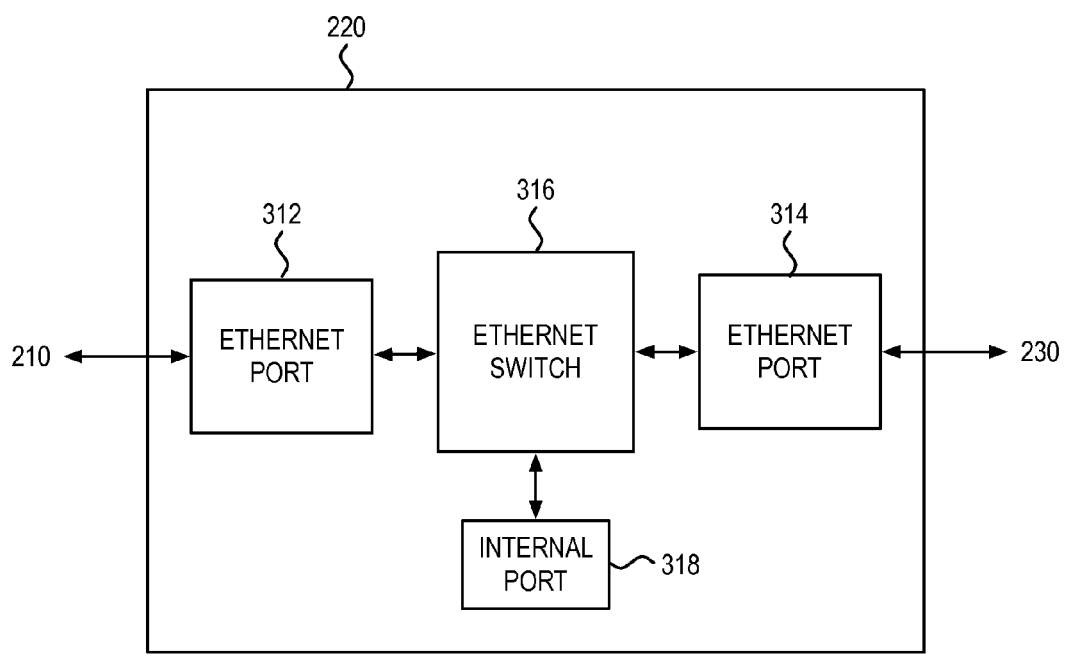
FIG. 3 illustrates an embodiment of an AV device that enables switching.

An embodiment of AV DEV 220 (or any intermediate AV DEV in a cascading chain) is illustrated in FIG. 3. As illustrated, AV DEV 220 includes at least two Ethernet ports 312, 314 and internal port 318. Ethernet ports 312, 314 and internal port 318 support full duplex links such that traffic can be coming from either direction at the same time. Traffic can also be switched to two ports simultaneously. For example, internal port can add traffic to either or both of Ethernet ports 312, 314, or receive traffic from either or both of Ethernet ports 312, 314. Ethernet ports 312, 314 and internal port 318 are coupled together via switch 316. Ethernet port 312 enables AV DEV 220 to communicate with AV DEV 210. Ethernet port 314, on the other hand, enables AV DEV 220 to communicate with AV DEV 230. In combination, Ethernet ports 312, 314 and switch 316 enable AV DEV 220 to operate as an end point device or as an intermediary device in the AV network. Said another way, AV DEV 220 can operate as a switch or simply as an originating/terminating AV device.

Figure 4:
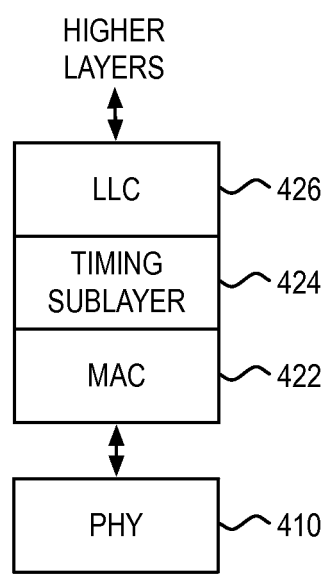
FIG. 4 illustrates an embodiment of a protocol stack in accordance with the present invention.

FIG. 4 illustrates an embodiment of a protocol stack for the architecture of FIG. 3. As illustrated, the protocol stack includes PHY 410 in the physical layer. In the data link layer, the protocol stack includes MAC 422, timing sublayer 424, and logical link control (LLC) 426. Here, timing sublayer 424 is an optional sublayer that can be included if a timing synchronization protocol for AV bridging is needed. As would be appreciated, the principles of the present invention can be applied to applications that do not support AV bridging.

In one embodiment, switch 316 and the PHYs for Ethernet ports 312, 314 are embodied as separate devices. In another embodiment switch 316 and the PHYs can be integrated into a single device, a single die, multiple dies, multiple chips, etc.

Significantly, the framework of FIGS. 3 and 4 is in contrast to conventional AV devices that support only a single network connection. With the inclusion of multiple network connections in an originating/terminating AV device, the new cascading topology of FIG. 2 can be supported. In one embodiment, each of AV DEVs 210-240 would also support AV bridging, thereby enabling guaranteed QoS connections to be supported by a set of AV devices.

Figure 5:
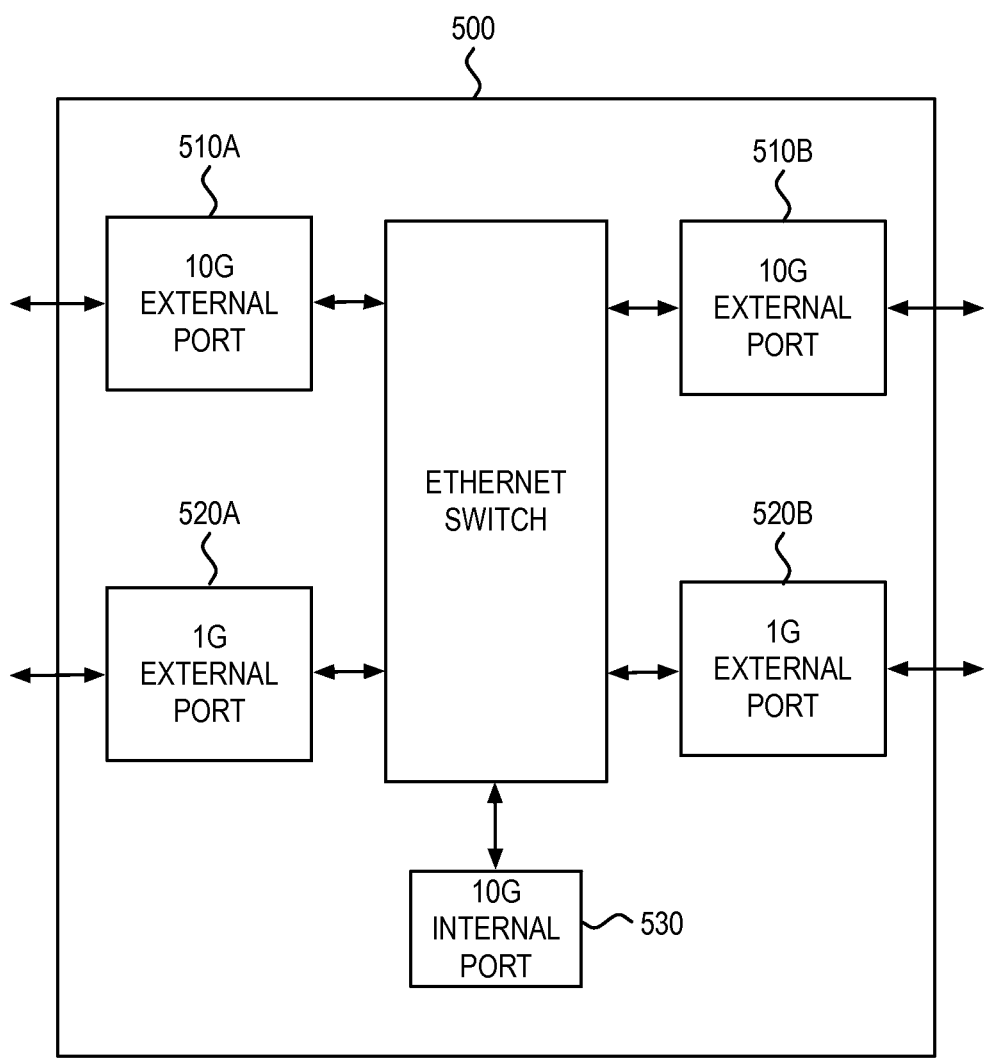
FIG. 5 illustrates a second embodiment of an AV device that enables switching.

FIG. 5 illustrates another embodiment of an AV device having five ports. As illustrated, AV device 500 includes two external 10 G ports 510A, 510B, two external 1 G ports 520A, 520B and a 10 G internal port. In this configuration, AV device 500 can support a high bandwidth network and a lower bandwidth network. For example, 10 G external ports 510A, 510B can be used for a high bandwidth network that can support HDTV content, while 1 G external ports 520A, 520B can be used for a lower bandwidth network that can support lower bandwidth data such as audio traffic. As would be appreciated, all of the external ports could be at the same speed, or at different speeds.

An advantage of the configuration of FIG. 5 is the support of two different wiring networks. For example, the high bandwidth and lower bandwidth networks could be color coded (e.g., ports, wires, connectors, etc.) such that a user can easily identify the ports that can support the same bandwidth level. Regardless of the speed of the external ports, the internal port can be configured to receive all of the information from the switch, regardless of the port that the information arrived on.

In one embodiment, the AV device can also support multiple types of media. For example, the high bandwidth network ports can support optical media, while the lower bandwidth network ports can support copper media. In this embodiment, the switch would remain the same but the PHY on each port would be specific to the speed and medium chosen.

A benefit of such a framework would be the ease with which a home theater application can be installed. Specifically, instead of using a central hub such as a receiver, a set of devices can be serially connected solely by Ethernet cabling. For example, a DVD player can be coupled to a DVR, which in turn is coupled to a speaker, which in turn is coupled to a television, etc. With this topology, a video signal could originate at the DVD player and terminate at the television, while passing through the DVR and the speaker. An audio signal, on the other hand, could originate at the DVD player and terminate at the speaker, while passing through the DVR. In this example, the intermediary devices would simply pass through the AV transport signal to the next AV device in the chain without terminating the AV transport signal. This represents conventional switching technology that has now been incorporated into the AV devices themselves.

Figure 6:
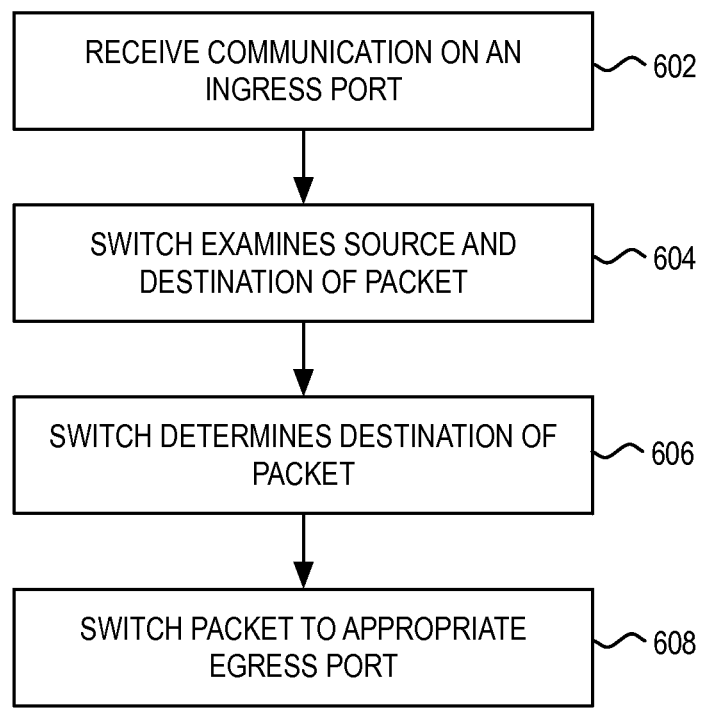
FIG. 6 illustrates a flowchart of a process of switching traffic between cascaded AV devices.

To illustrate this feature of the present invention more clearly, reference is now made to the flowchart of FIG. 6, which describes the flow of traffic between AV DEVs 210, 220, and 230. To illustrate this process, it is assumed that AV DEV 210 is a DVD player, AV DEV 220 is a television, and AV DEV 230 is a surround sound receiver.

As illustrated, the process begins at step 602 where communication is received on an ingress port on an AV device. In the current example, this step can be represented by the receipt of an Ethernet communication from the DVD player at a first Ethernet port of the television. The communication on the link between the DVD player and the television is not restricted to traffic between the DVD player and the television. Rather, the communication on the link between the DVD player and the television can carry traffic between multiple pairs of AV devices. Specifically, the communication can include a video signal between the DVD player and the television and an audio signal between the DVD player and the surround sound receiver. The support of traffic between multiple pairs of AV devices on a single link is the consequence of having an Ethernet network that supports independently addressable network devices.

Figure 7:
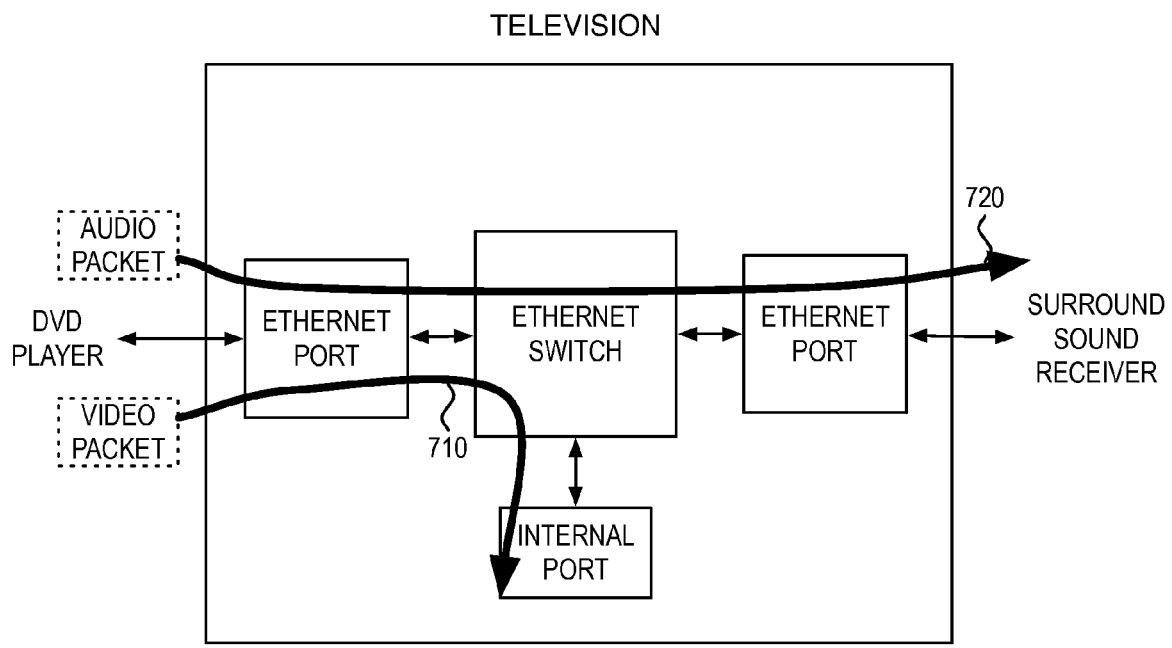
FIG. 7 illustrates an example of packet routing in an AV device.

At the television, the switch is used to route traffic to its intended destination. At step 604, the switch in the television would examine the source and destination of the packet. Next, at step 606, the switch would determine a destination of the packet. Finally, at step 608, the switch would send the packet to the appropriate egress port. In the current example, the switch can determine that a packet (e.g., containing video data) is destined for the television. In that case, the television switch would route the packet to the appropriate egress port, which is the internal port of the television. This routing is illustrated by path 710 in FIG. 7. If, on the other hand, the switch determines that the packet (e.g., containing audio data) is destined for a device on a second Ethernet port (e.g., the surround sound receiver or other AV device beyond the surround sound receiver), then the switch would route the packet to the egress port supported by the second Ethernet port of the television. This second Ethernet port enables transmission of the non-terminating traffic to the surround sound receiver. This routing is illustrated by path 720 in FIG. 7. As would be appreciated, multicast traffic can also be supported by the switch, such that traffic is destined to be put on all ports.

As this process illustrates, a cascading network between AV devices that each incorporate multiple Ethernet ports and a switch enables traffic to be routed between AV devices even if they are not directly connected. In other words, each AV device has access to the information in any device that is connected to the network, regardless of whether a direct connection exists between the two devices. One of the benefits of such a supported topology is the ease by which a network can be configured. With the principles of the present invention, AV devices can be connected to the nearest AV device without regard to whether independent communication will occur between those two devices. This can also increase the distance between pairs of devices. Cabling costs are also saved through the elimination of redundant wiring that results when a plurality of long cable runs are used in a point-to-point topology.

While the above description has been provided in the context of 10 GBASE-T, the principles of the present invention are not so limited. Rather, the principles of the present invention can be applied to 10BASE-T, 100BASE-TX, 1000BASE-T, 40 GBASE-T, 100 GBASE-T, etc. The principles of the present invention can also be applied to non-standard speeds such as 2.5 G and 5 G. Additionally, the principles of the present invention would not be limited to copper BASE-T interfaces, but could also apply to optical interfaces (e.g., 1000BASE-SX, 1000BASE-LX, 10 GBASE-LRM, etc.). As would be appreciated, the principles of the present invention would not be dependent upon the support of AV bridging.

Also, it should be noted that traffic above Layer 2 can also be supported by the principles of the present invention. For example, the switch can be designed to support higher layer protocols such as TCP/IP, UDP, etc. In one example, the switch can make switching/routing decisions based on IP datagram that have their own header information.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A method in an audio/video network, comprising:
   receiving, at a first Ethernet physical layer device in a first audio/video device, communication from a second Ethernet physical layer device in a second audio/video device via a first Ethernet cable, said communication including first audio/video data that has said first audio/video device as its destination and second audio/video data that has a third audio/video device as its destination, said third audio/video device including a third Ethernet physical layer device that is coupled to a fourth Ethernet physical layer device in said first audio/video device via a second Ethernet cable;
   routing via a switch in said first audio/video device, said first audio/video data to an internal port in said first audio/video device, said switch being coupled to said first Ethernet physical layer device and said fourth Ethernet physical layer device;
   displaying an audio/video data stream based on said first audio/video data on a display of said first audio/video device; and
   routing via said switch in said first audio/video device, said second audio/video data to said fourth Ethernet physical layer device for delivery to said third Ethernet physical layer device, wherein said first audio/video device supports a network synchronization protocol that enables said first audio/video device to facilitate a connection between said second audio/video device and said third audio/video device through said first Ethernet physical layer device, said switch, and said fourth Ethernet physical layer device at a guaranteed level of bandwidth and latency.

2. The method of claim 1, wherein said receiving comprises receiving 10GBASE-T communication at said first Ethernet physical layer device.

3. The method of claim 1, wherein said first audio/video device is an audio/video receiver.

4. The method of claim 1, wherein said first audio/video device is a DVD player.

5. The method of claim 1, wherein said first audio/video device is a television.

6. The method of claim 1, further comprising reserving, at said first audio/video device, a connection for said second audio/video data at a defined quality of service.

7. The method of claim 1, wherein said second audio/video data is not extracted by said first audio/video device.

8. A method in an audio/video network, comprising:
  receiving, at a first Ethernet physical layer device of a first audio/video device, a packet from a second audio/video device;
  examining a destination field of said received packet;
  routing, by a switch in said first audio/video device, said received packet to an internal port when said examination indicates that said first audio/video device is the destination of said received packet and displaying, by a display contained in said first audio/video device, an audio/video data stream based on data contained within said received packet; and
  routing, by said switch in said first audio/video device, said received packet to a second Ethernet physical layer device of said first audio/video device when said examination of said destination field indicates that a third audio/video device coupled to said second Ethernet physical layer device via a second Ethernet cable is the destination of said received packet, wherein said first audio/video device supports a network synchronization protocol that enables said first audio/video device to facilitate a switched connection between said second audio/video device and said third audio/video device at a guaranteed level of bandwidth and latency.

9. The method of claim 8, wherein said first audio video device is an audio speaker device.

10. The method of claim 8, wherein said first audio video device is a DVD player.

11. The method of claim 8, wherein said first audio video device is a television.

12. The method of claim 8, further comprising reserving, at said first audio/video device, a switched connection between said second audio/video device and said third audio/video device at a defined quality of service.

13. An audio/video display device, comprising:
  a first Ethernet physical layer device that is coupled to an audio/video source device via a first Ethernet cable;
  a second Ethernet physical layer device that is coupled to an audio/video destination device via a second Ethernet cable;
  a display that is configured to display audio/video data; and
  a switch that is coupled to said first Ethernet physical layer device and said second Ethernet physical layer device, said switch being configured to route a first packet that is received at said first Ethernet physical layer device to an internal port when a destination field of said first packet indicates that said audio/video display device is a destination for said first packet, wherein audio/video data that is contained in said first packet is displayed on said display, said switch being further configured to route a second packet that is received at said first Ethernet physical layer device to said second Ethernet physical layer device for delivery to said audio/video destination device when a destination field of said second packet indicates that said audio/video destination device is a destination for said second packet, wherein said audio/video display device supports a network synchronization protocol that enables said audio/video display device to facilitate a connection between said audio/video source device and said audio/video destination device through said first Ethernet physical layer device, said switch, and said second Ethernet physical layer device at a guaranteed level of bandwidth and latency.

14. The device of claim 13, wherein said first Ethernet physical layer device is a 10GBASE-T physical layer device.

15. The device of claim 13, wherein said audio/video display device is an audio/video receiver.

16. The device of claim 13, wherein said audio/video display device is a DVD player.

17. The device of claim 13, wherein said audio/video display device is a television.

* * * * *